United States Patent
Heinritz et al.

(10) Patent No.: US 8,507,829 B2
(45) Date of Patent: Aug. 13, 2013

(54) METHOD FOR PRODUCING COARSE SURFACE STRUCTURES

(75) Inventors: Silvo Heinritz, Lengefeld (DE); Uwe Heinritz, Lengefeld (DE); Marcus Polster, Ludwigsburg (DE); Claudia Hartmann, Kornwestheim (DE); Mirko Jedynak, Mittweida (DE)

(73) Assignee: ACSYS Lasertechnik GmbH, Kornwestheim (DE)

( * ) Notice: Subject to any disclaimer, the term of this patent is extended or adjusted under 35 U.S.C. 154(b) by 280 days.

(21) Appl. No.: 12/931,206

(22) Filed: Jan. 26, 2011

(65) Prior Publication Data
US 2012/0061359 A1    Mar. 15, 2012

(30) Foreign Application Priority Data
Sep. 10, 2010 (EP) .................................. 10176255

(51) Int. Cl.
*B29C 45/00* (2006.01)
*B23K 31/00* (2006.01)
*B23K 26/00* (2006.01)

(52) U.S. Cl.
USPC ............ 219/121.69; 148/525; 29/897.1; 29/402.01; 216/65; 216/52; 216/75; 216/94

(58) Field of Classification Search
USPC ............ 219/121.68, 121.69, 121.8, 121.81, 219/121.85; 492/28, 37; 264/400; 29/890.1, 29/890.128; 216/52, 65, 75, 94; 239/602; 148/525
See application file for complete search history.

(56) References Cited

U.S. PATENT DOCUMENTS

| | | | | |
|---|---|---|---|---|
| 4,794,680 A * | 1/1989 | Meyerhoff et al. | ............. | 492/54 |
| 5,322,988 A * | 6/1994 | Russell et al. | ........... | 219/121.69 |
| 5,329,773 A * | 7/1994 | Myers et al. | .................... | 60/759 |
| 5,338,915 A * | 8/1994 | Hildebrand et al. | ..... | 219/121.69 |
| 6,147,322 A * | 11/2000 | Xuan et al. | ............... | 219/121.69 |
| 6,888,853 B1 * | 5/2005 | Jurgensen | ......................... | 372/6 |
| 7,354,695 B2 * | 4/2008 | Brennen et al. | ............ | 430/272.1 |
| 7,822,294 B2 * | 10/2010 | Ohlinger et al. | .............. | 382/302 |
| 8,250,757 B2 * | 8/2012 | Young | ......................... | 29/888.3 |
| 2007/0231541 A1 * | 10/2007 | Humpal et al. | ................. | 428/141 |
| 2007/0235902 A1 * | 10/2007 | Fleming et al. | ............... | 264/400 |
| 2010/0104479 A1 * | 4/2010 | Gu et al. | ...................... | 422/102 |
| 2011/0085241 A1 * | 4/2011 | Purchase et al. | .............. | 359/599 |

FOREIGN PATENT DOCUMENTS
EP    0 536 625 A1    4/1993

* cited by examiner

*Primary Examiner* — Samuel M Heinrich
(74) *Attorney, Agent, or Firm* — Von Rohrscheidt Patents

(57) ABSTRACT

A method for producing rough surface structures comprising the following step: running a laser beam along filling lines (1) over an area to be processed, wherein the filling line (1) is broken down into particular laser dots (2) with a distance a, and wherein the laser dots (2) are moved in a X direction and in a Y direction in a plane with a random factor b relative to the filling line (1) so that they form a cloud of dots.

14 Claims, 4 Drawing Sheets

METHOD FOR PRODUCING COARSE SURFACE STRUCTURES

RELATED APPLICATIONS

This patent application claims priority from and incorporates by reference European patent application EP 10176255, filed on Sep. 10, 2010.

FIELD OF THE INVENTION

The invention relates to a method for producing rough surface structures. Rough surface structures according to the invention are structures which are perceived by the human eye as surfaces with evenly distributed roughness. The methods known in the art for producing surface structures of this type emphasize producing a roughness without a detectable grid or shading. In case the surfaces have a three dimensional structure it shall be avoided to lose details of the three dimensional structure of the original surface when generating rough surface portions.

The surface structures produced by the method are used, for example, during surface treatment and surface modification when fabricating tools and dies. Main areas of application are in particular the fabrication of injection molding tools and embossing tools and their repair and overhaul, so called refreshing. In the coin industry these methods are useable for producing and overhauling and refreshing coin embossing stamps, also designated as frosting. Additional areas of application are the production, repair and overhaul and the refreshing of micro molds and micro punches.

These areas of application have in common that respectively three dimensional original structure is maintained respectively and that at least portions of the original structure shall be provided with a rough surface structure.

The original structure shall be interpreted as a three dimensional configuration of a surface, for example, of a coin embossing stamp, wherein particular portions of the three dimensional surface structure shall be provided with a rough finish for optical reasons or other reasons. Surface modifications of this type are obtained in the art through sand blasting, spark erosion, or etching.

The disadvantages of sand blasting and etching are that a mask is required which has to cover the segments of the three dimensional surface structure which shall not be affected by the modification. This is performed, for example, by taping the respective segments of the three dimensional surface structure over which are not to be treated.

Spark erosion has the significant disadvantage that a drop down electrode always has to be produced which has to mirror the entire surface to be treated, wherein the surface often has a three dimensional configuration. This method which produces high quality results is very complex and therefore can only be used economically in selected applications.

Furthermore an application of lasers is known in the art for modifying surfaces. Thus, the desired contours are filled with the laser with line hatching with different densities and with different angles with lasers with various pulse widths, shapes, times, peak powers and various output powers.

When producing rough surface structures of this type with lasers, however, a particular optically detectable pattern is always produced which is caused by the line processing of the segments with a laser beam. Even when using plural fillings with intersecting or otherwise overlapping lines this pattern can never be avoided completely and furthermore structures and subtleties of the original surface can be lost.

From DE 601 02 007 T2 a method for processing female dies with hardened surfaces for coins or metals is known, wherein a motive is formed in the hardened surfaces which is only formed from more or less densely arranged rows of indentations. Each indentation thus essentially has the same diameter which is between 0.1 and 3 μm (micrometer), wherein each indentation in turn has the same depth.

Presumably the periodically repeated application of the laser for generating the indentations also maintains undesirable systematic patterns which are also visible after treatment.

Thus, it is the object of the invention to provide a method for producing rough surface structures which avoids the recited disadvantages and which in particular generates rough surface structures which do not show or generate systematic patterns within the roughness.

According to the invention the object is achieved through a method for generating rough surface structures through laser treatment in which a laser beam is run along filling lines over the area to be treated. It is crucial that the filling line is broken down into particular laser dots with a determinable distance a and that the laser dots are moved relative to the filling line in a plane in X and Y direction by a random factor, so that they form a cloud of dots.

The method according to the invention facilitates finishing and modifying surfaces in which traces from milling, grinding or similar traces are provided which are not detectable any more after the treatment. The method facilitates increasing the roughness of defined portions and modifying ground or polished or similar surfaces.

A defined treatment shall thus be interpreted so that a modified surface can be provided with a precisely defined roughness.

According to the concept, the random character of the distribution of the particular laser dots on the filling line and about the filling line prevents that pattern orientations which are detectable in the prior art, for example, as lines, circles, meanders, rectangles, squares or geometrical objects cannot be detected optically anymore. According to the invention the undesirable pattern structures blur in the plurality of the laser dots of the cloud of dots and are not visible anymore to the human eye.

During laser treatment the typical filling lines are initially broken down into particular dots with a distance a through a suitable software algorithm. The distance a thus typically is in a range of 10 μm to 40 μm.

According to the invention this is performed in that the dot distance a is predetermined for the filling lines as a uniform parameter, for example, in millimeters and each line is divided by this value. This yields a particular number of dots with a defined distance and a processing direction for the laser.

An adjustable random factor b is also applied to the position of these laser dots through a software algorithm and the laser dots are randomly moved in this manner in a plane, thus in a X and in a Y direction. As a result a cloud of dots is generated which appears as a rough structure. The random factor b is thus given in percent, wherein 100% corresponds to the previously selected dot distance a.

A preferred embodiment of the invention is characterized in that a distance a of the dots of a filling line additionally differs from a distance a of the dots of the adjacent filling line when different distances are used for different filling lines. The selection of the distance a is performed in a predeterminable or random manner.

According to another embodiment of the invention the distances c of the filling lines from one another are also determinable or configured with random variability.

It is advantageous in particular for this method that the filling can be selected by the user as a function over the distance of the laser dots a and the degree of randomness of the movement of the dots relative to the filling line in the plane is adjustable through the parameters of the random function b that is being used in order to adapt the desired surface structure with respect to its roughness to the actual requirements.

The parameter dot distance a determines the distance of the dots amongst one another, whereas the parameter random factor b, for example, in percent states the blur area in which the position of the dot can vary, wherein 100% is the distance to the next dot.

The other parameters in the art of laser treatment of surfaces like power, pulse frequency and length and scan velocity have a reinforcing or augmenting additional influence on the treatment result.

According to a preferred embodiment of the invention a random length is additionally applied the particular laser dots. A laser dot or dot according to the invention is a micro cavity, subsequently also designated as cavity. The length of the laser dot for a three dimensional consideration is thus the depth of the beam or line shaped cavity created by the laser. This facilitates that a particular laser dot loses its pattern character also with respect to the depth and punctiform configuration of the cavity created. This creates very short vectors.

The orientation of the line shaped cavity is preferably used as another parameter for improving the appearance of the rough surface. A differentiation has to be made between the position of the line shaped cavity in the plane, the XY plane and the position of the line shaped cavity in a three dimensional space characterized by the X-Y-Z coordinates.

The angle $\alpha$ of the deviation of the direction of the beam or line shaped cavity from the direction of the filling line in the plane is thus in a range of 0° to 360°.

The angle $\beta$ of the deviation of the direction of the beam or line shaped cavity from the surface orthogonal, the Z direction thus is preferably in a range of 45° to 90°.

In a cavity that is applied at a slant angle to the surface orthogonal the laser dots appear as oval or elliptic surfaces in a top view of the surface.

The parameter line length l in micrometers states, for example, up to which length the short vectors can be formed. Typically this parameter l is in a range of 0.5 µm to 10 µm.

The combination of random line length l, random direction through the angles $\alpha$ and/or $\beta$ and random dot movement yields a treatment result in which a random character of the surface roughness is achieved with three parameters which is not achievable with conventional methods.

A standard random number generator is used for computing the random distribution, wherein the method and the desired optical appearance of the rough surface can be precisely defined and predetermined by the degree of the random factors.

It is a particular advantage of the invention over prior art methods that partial surface modifications can be generated without masks and without electrodes and thus without intermediary steps directly on the work piece.

Also the result, the roughness of the surface is controllable and determinable by the degree of the distribution, the density, the position and the length or the depth of the laser dots in a defined manner. The method is furthermore configured to be completely automated, wherein human error can be excluded in the production process.

It is another advantage that an additional hardening effect is generated on the surface which leads to an extension of the service life of the tools in particular when modifying coin embossing dies.

In the tool and die industry the method for roughening surfaces and taking away the glare from surfaces, for example, air vents in motor vehicles can be advantageously applied.

Compared to spark erosion and etching no substances are created through laser technology that need to be disposed of in a controlled manner which yields an ecological and economic advantage over these methods.

Furthermore the production and processing time for surfaces is reduced and material savings are achieved by omitting masks and electrodes compared to sand blasting and spark erosion.

BRIEF DESCRIPTION OF THE DRAWINGS

Additional details, features and advantages of the invention are apparent from the subsequent description of embodiments when viewed with reference to the appended drawings, wherein:

FIG. 2 illustrates a breakdown of the lines into dots with selectable distance a;

DETAILED DESCRIPTION OF THE INVENTION

Figure 1:
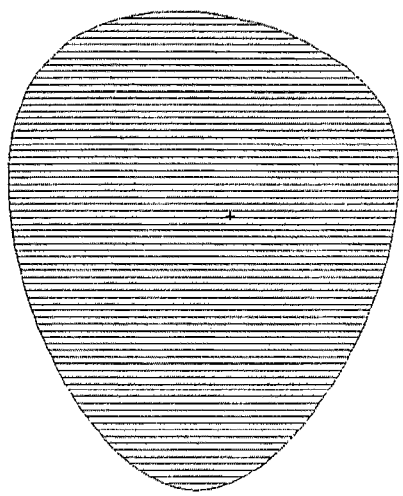
FIG. 1 illustrates a filling of a random contour with filling lines.
Figure 2:
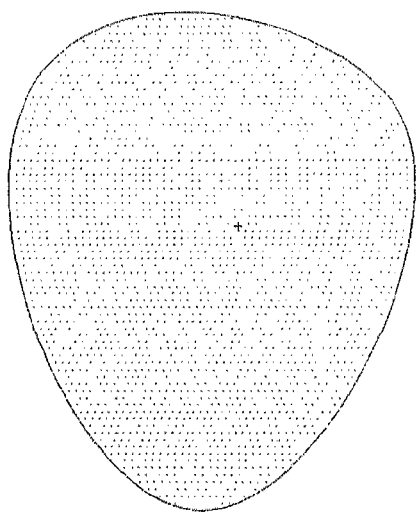
Figure 3:
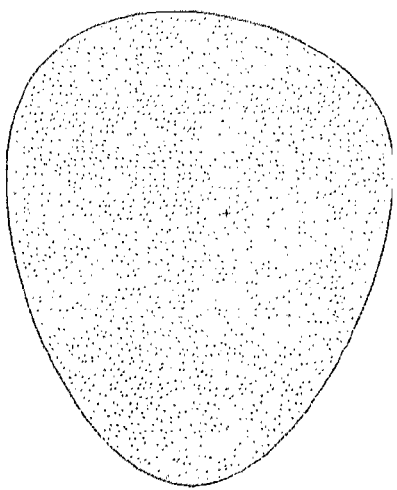
FIG. 3 illustrates a random movement of the dots with the random factor b.

FIG. 1 illustrates the filling of a random contour with prior art filling lines. Starting with this basic pattern the undesirably even line structure is already blurred by breaking the lines down into dots with a selectable distance a according to FIG. 2. As evident, however, the line structure and the grid structure are still optically perceivable after this processing step and the processing result thus is not optimum yet. Thereafter the step illustrated in FIG. 3 of random movement of the dots with the random factor b is performed in the plane in the X direction and in the Y direction. This breaks down the line structure and the roughness of the surface is optically achieved.

Figure 4:
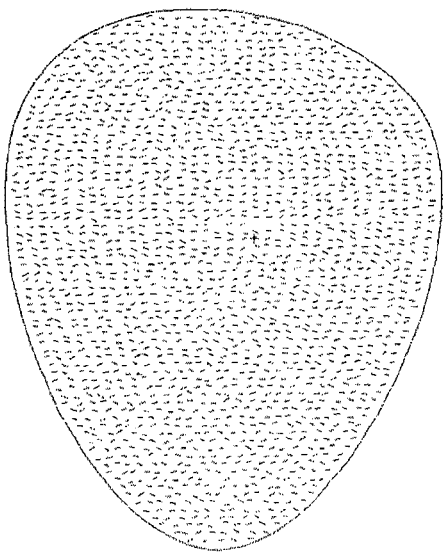
FIG. 4 illustrates an enlargement of the dots with the parameter line length l.

FIG. 4 illustrates the additional modification of the particular laser dots with the parameter line length l which provides an additional blurring and thus an optical improvement of the roughness.

Besides the direction of the laser dots in the plane of the XY coordinate system which is generated by the line length l and which deviates from the direction of the filling lines, an additional parameter can be advantageously used through the depth and the direction of the linear cavity for generating the surface roughness.

Figure 5A:
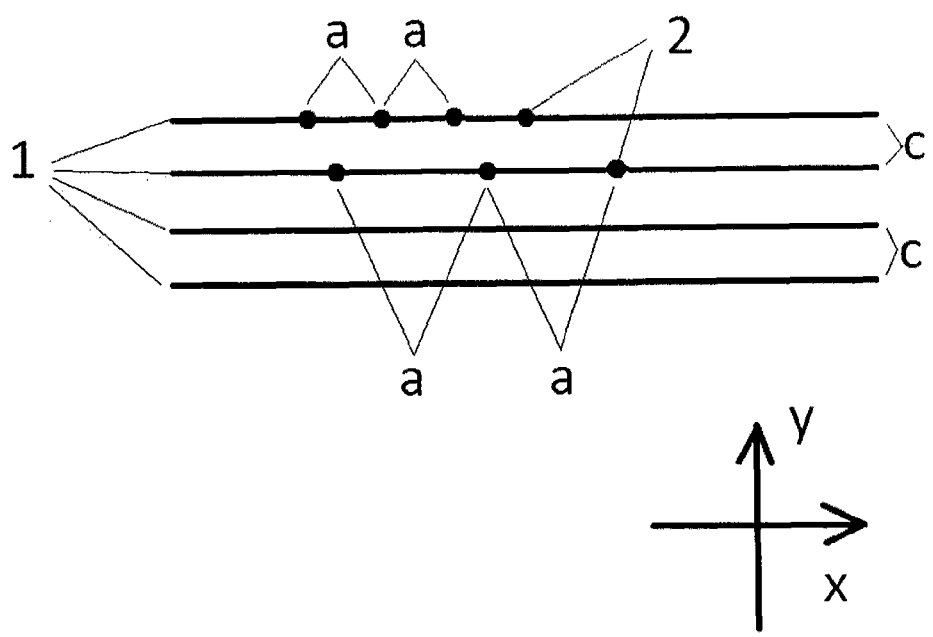
FIG. 5a, b, c, and d illustrates a principle view of the distribution of the dots in the plane and configuration of the cavities in the depth.

FIG. 5a illustrates the principle of distributing laser dots in the plane in an XY coordinate system in a highly abstract and enlarged manner. The filling lines 1 are disposed parallel to one another at a distance c in the area to be processed. The laser dots 2 of a filling line 1 have the distance a. The distance a between the laser dots 2 on a filling line 1 is separately selected for each filling line 1 for the illustrated embodiment. Depending on the parameterization of the method the distance a however, can also be selected identical for all filling lines 1 of an area to be processed.

Figure 5B:
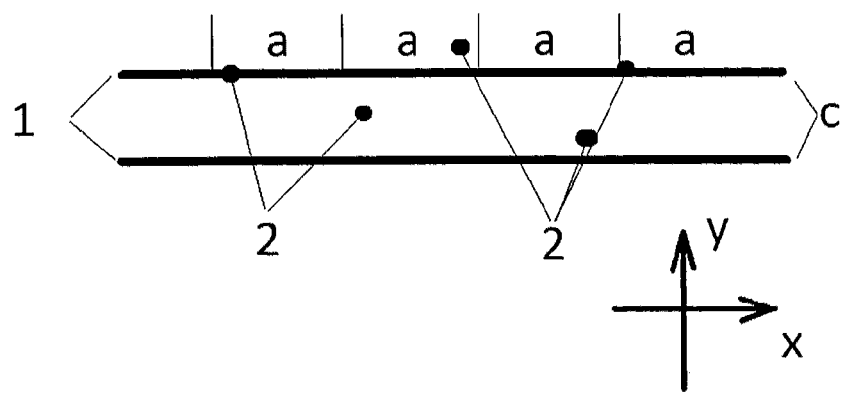

In FIG. 5b the subsequent step of random movement of the laser dots 2 on the filling line 1 in X direction and also the random movement of the laser dots 2 in Y direction are illustrated in principle in a highly enlarged view.

Figure 5C:
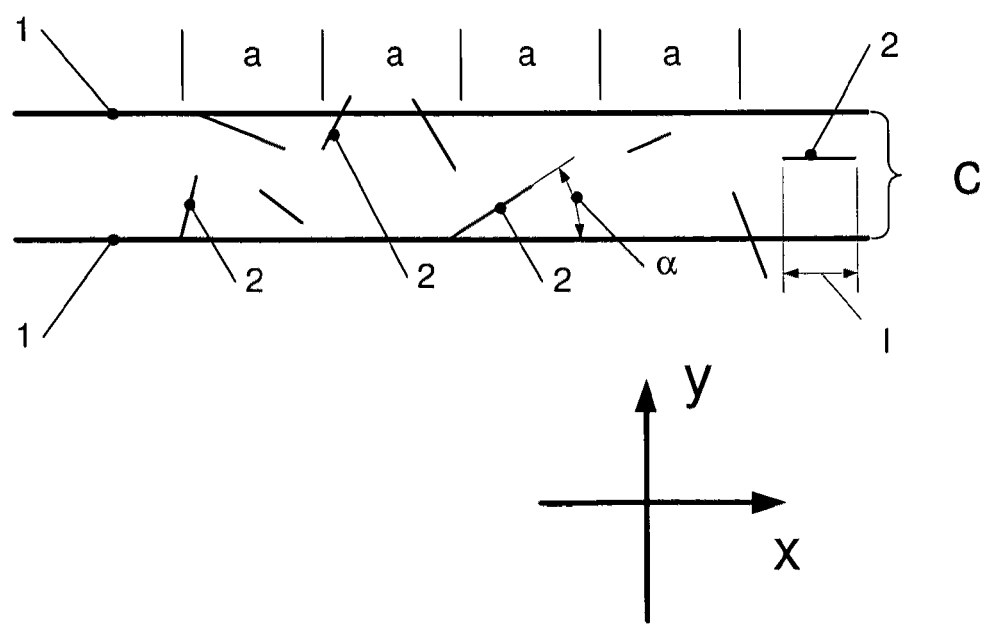

In FIG. 5c the filling lines 1 are illustrated designated with their distance c from one another and laser dots 2 formed in the X-Y plane are designated as cavities 3 that are disposed in the plane and that are line shaped or groove shaped. The laser dots 2 configured as line segments have a length l and a direction which is designated as an angle α with reference to the position of the filling lines. This configuration of the random distribution of the dots 2 in the direction and in the X and Y direction and of the length l of the lines and their random direction α in the plane creates an image as illustrated in FIG. 4 in a highly enlarged manner. The length l is implemented with 0.5 μm to 10 μm in the embodiment.

Figure 5D:
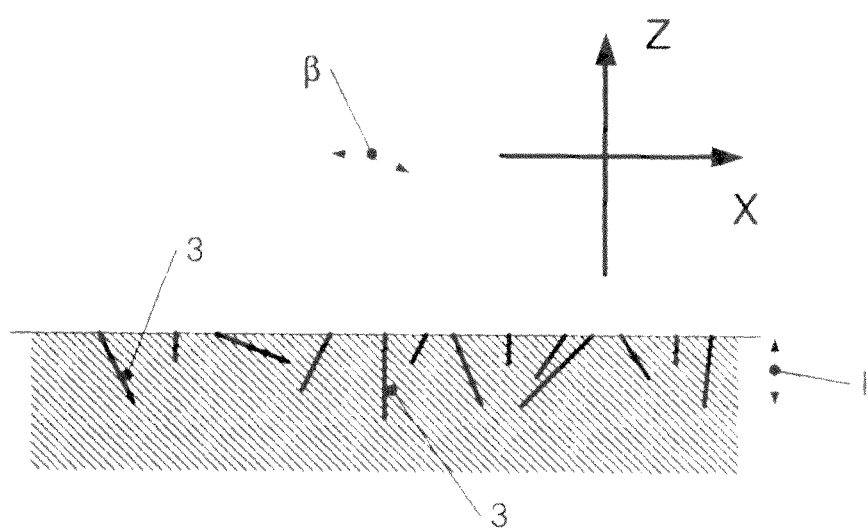

FIG. 5d illustrates a processed surface in a sectional view. The surface orthogonal is indicated as Z direction. The laser generates cavities 3 with a length l on the surface. An additional configuration of the surface structure can be derived from the direction of the processing of the laser beam and the position of the cavity 3 resulting there from. The position of the cavity 3 in a three dimensional space is determined by the angle β at which the cavity 3 is aligned relative to the surface orthogonal, thus the Z direction. Particularly advantageous results are being achieved when the angle α for adjacent laser dots is selected in a random manner. The length l is also implemented in this embodiment with 0.5 μm to 10 μm.

REFERENCE NUMERALS AND DESIGNATIONS

1 filling line
2 laser dot, dot
3 cavity
a distance of the laser dots of a filling line from one another
b random factor
c distance of the filling lines from one another
l length of cavities
α angle relative to the orientation of the filling line
β angle relative to the direction of the surface orthogonal

What is claimed is:

1. A method for producing rough surface structures comprising the following steps:
defining respective filling lines in an area to be processed;
defining respective points on the respective filling lines, wherein respective points on a respective filling line have a distance from one another;
moving the respective points on a respective filling line respectively in a X-direction and in a Y-direction in a plane by a random factor relative to the respective filling line; and
treating exclusively the moved points with a laser so that they form laser dots.

2. The method according to claim 1, wherein the distance of the respective points on a respective filling line from one another is in a range of 10 μm to 40 μm.

3. The method according to claim 1, wherein distances of adjacent filling lines from one another are selected differently.

4. The method according to claim 1, wherein the laser dots are configured line shaped with a random length l in the plane in the X-Y direction.

5. The method according to claim 1, wherein the laser dots are configured line shaped with a random length l with a component in a Z-direction orthogonal to the plane in the X-Y direction.

6. The method according to claim 4, wherein the length l of the laser dots is in a range between 0.5 μm and 10 μm.

7. The method according to claim 4, wherein a laser is given a random direction when generating the laser dots and generated cavities are provided at an angle α relative to the direction of the filling lines.

8. The method according to claim 7, wherein the angle α is in a range between 0° and 360°.

9. The method according to claim 5, wherein the laser is given a random direction when generating the laser dots and the generated cavities are configured at an angle β relative to the Z-direction.

10. The method according to claim 9, wherein the angle β is in a range of 45° to 90°.

11. The method according to claim 1, wherein the random factor is predeterminable.

12. The method according to claim 5, wherein the length l of the laser dots is in a range between 0.5 μm and 10 μm.

13. The method according to claim 5, wherein the laser is given a random direction when generating the laser dots and generated cavities are provided at an angle α relative to the direction of the filling lines.

14. The method according to claim 13, wherein the angle α is in a range between 0° and 360°.

* * * * *